United States Patent [19]

Taniguchi et al.

[11] Patent Number: 5,233,382
[45] Date of Patent: Aug. 3, 1993

[54] RANGE FINDING DEVICE UNAFFECTED BY ENVIRONMENTAL CONDITIONS

[75] Inventors: Isao Taniguchi, Saitama; Kazuhiro Kawajiri; Hiroshi Tamura, both of Kanagawa, all of Japan

[73] Assignee: Fuji Photo Film Company, Ltd., Kanagawa, Japan

[21] Appl. No.: 862,177

[22] Filed: Apr. 2, 1992

[30] Foreign Application Priority Data

Apr. 3, 1991 [JP] Japan .................................. 3-98236
Apr. 3, 1991 [JP] Japan .................................. 3-98245

[51] Int. Cl.⁵ .................... G03B 13/36; G01C 3/10
[52] U.S. Cl. ............................ 354/403; 354/408; 356/1; 356/4
[58] Field of Search ................. 354/402–408; 356/1, 4

[56] References Cited

U.S. PATENT DOCUMENTS 4,828,383  5/1989  Kunishige et al. .................. 356/1

Primary Examiner—W. B. Perkey
Attorney, Agent, or Firm—Birch, Stewart, Kolasch & Birch

[57] ABSTRACT

A range finding device having a lens holder with two tunnels, and two lens plates mounted in front of the tunnels. Two pins are formed on the front surface of the lens holder, the two pins being positioned on vertical positioning lines externally of the vertical center lines of the two tunnels. Each lens plate has an elongated hole extending in the direction of the vertical positioning line, a pin being inserted in the elongated hole. In a preferred embodiment, each lens plate has four holes formed therein. Two of the four holes are used for coupling with two pins. Of these two holes used for positioning, one is a round hole and the other is an elongated hole.

21 Claims, 7 Drawing Sheets

RANGE FINDING DEVICE UNAFFECTED BY ENVIRONMENTAL CONDITIONS

BACKGROUND OF THE INVENTION

1. Field of the Invention

The present invention relates to a range finding device for detecting a distance of a subject by an optical triangulation method, and more particularly to an improved range finding device free from displacement of a lens optical axis as caused by environmental conditions.

2. Description Related to the Prior Art

Recent photographic cameras and video cameras are equipped with an autofocus system for automatically focussing a taking lens. This autofocus system is constructed of a distance measuring device for measuring a distance of a subject and a lens setting mechanism for setting a taking lens to a position suitable for the subject distance. As a distance measuring device, a range finding device is widely used which measures a distance of a subject by an optical triangulation method. Such a range finding device includes an active type device and a passive type device. The active type device has a light projector for projecting light toward a subject and a light receiver for detecting light reflected from the subject, the light projector and light receiver being disposed spaced apart by a predetermined length of a base line. The passive type device has two light receivers spaced apart by a predetermined base length.

FIG. 7 shows an autofocus system having a passive type range finding device. Two lenses 3a and 3b having the same specifics are mounted with their optical axes being disposed in parallel and with the distance between two optical axes being set to a lens base length B. Mounted on the focussing plane of the lenses 3a and 3b are line image sensors 5a and 5b each having a plurality of pixels disposed in the direction along the base line. Representing the focal length of each lens by F, a distance of a subject at point S by L, and a distance, from the optical axis of the lens 3b to a point on the image sensor 5b to which light from point S is incident, by X, the following equation is satisfied:

$$L = (B \times F)/X$$

The distance X corresponds to a deviation of an image of the subject S focussed on the image sensor 5a from an image of the subject S focussed on the image sensor 5b. The subject distance L can be obtained by calculating the distance X as detected. A processing circuit 6 compares signals from the two image sensors 5a and 5b, while sequentially shifting one of the signals by one pixel at a time. When both the signals become the same within the range of a predetermined number of shifted pixels, the distance X can be obtained by multiplying a pixel pitch by the number of shifted pixels. The obtained distance X is correlated to the object distance L, so a lens drive circuit 7 is actuated to correspondingly drive a motor 8 and set a taking lens 9 at a lens position suitable for the distance X.

FIG. 8 shows a conventional integral range finding device as a unit. Lens sections 3a and 3b are integrally formed on a transparent acrylic resin lens plate 10 at positions spaced by a lens base length B. A lens holder or housing 11 has two tunnels of a quadrangle in section and is made of black colored plastics. On the front surface of the lens holder 11, the lens plate 10 is fixed with adhesive agent in the state of high positioning precision. On the back surface of the lens holder 11, an IC package 13 is fixed with adhesive agent. This IC package 13 has image sensors 5a and 5b covered with a cover glass 12. Reference pixels of the image sensors 5a and 5b are disposed spaced apart by a sensor base length C which is set equal to the lens base length B.

It is essential for the range finding device described above that the lens base length B representing the distance between the optical axes of the lens sections 3a and 3b be quite the same as the sensor base length C representing the distance between the reference pixels of the image sensors 5a and 5b. However, in an assembled state of the range finding device in a camera body, the lens plate 10, lens holder 11, and the silicon substrate forming the image sensors 5a and 5b expand or contract differently from each other at given temperature and humidity. Therefore, the spherical surfaces of the lens sections 3a and 3b may be deformed by a force caused by a difference of expansion or contraction between the lens plate 10 and lens holder 11. Furthermore, each element changes its mounting position as temperature or humidity changes, resulting in a relative change between the lens base length B and the sensor base length C. For example, since the thermal expansion coefficient of silicon substrate of the IC package 13 is small, the sensor base length C changes less with environmental conditions. However, resin is often used as the raw material of the lens holder 11 and lens plate 10, so that the lens base length B is likely to change greatly. A relative change between the lens base length B and sensor base length C is a main factor of distance measuring error, unable to maintain a reliable measurement precision.

SUMMARY OF THE INVENTION

It is a principal object of the present invention to provide a range finding device capable of maintaining a reliable measurement precision without being influenced by environmental conditions such as temperature and humidity.

It is another object of the present invention to provide a range finding device in which spherical surfaces of lenses are free from deformation even under the influence of temperature and humidity.

It is still another object of the present invention to provide a range finding device capable of preventing the lens base length and sensor base length from becoming different by the influence of temperature and humidity.

It is a further object of the present invention to provide a range finding device capable of mounting two lenses manufactured by using the same mold in the same mounting posture, without placing one of the two lenses upside down.

The above and other objects of the invention can be achieved by provision of a range finding device comprising a lens holder having two light paths, and two lenses mounted in front of the lens holder. The lens holder is provided with two positioning members along two positioning lines extending in the direction perpendicular to the base line and traversing the light paths. Each lens is engaged with the lens holder in front of the light paths by means of the two positioning members.

According to a preferred embodiment of the present invention, each positioning line is determined outwardly of a line passing the lens optical axis and extending in the direction perpendicular to the base line. As the positioning member, a pin is used. Each lens has two holes into which pins are inserted. The two holes of each lens are preferably two elongated holes, or one elongated hole and one round hole. The dimension of the round hole is determined such that it allows tight fitting with the pin. The elongated hole extends in the positioning line direction.

According to another preferred embodiment of the present invention, four holes are formed in each lens. Two of the four holes engage with two pins. With this structure, the same mold can be used for manufacturing a pair of two lenses, allowing to manufacture two lenses having quite the same lens characteristics. In addition, it is possible to mount the two lenses on the lens holder without placing upside down one of the two lenses, hence never degrading a similarity of two images by two lenses. When two elongated holes and two round holes are formed in each lens, the mounting posture of each lens is limited to one type, improving the efficiency of assembly work.

According to the present invention, a pair of lenses is correctly positioned in the base line direction, and has some play in the direction perpendicular to the base line. As a result, even if the lenses and lens holder differently expand or contract due to a change of environmental conditions, the lenses move with respect to the pin as fulcrum without being displaced by the lens holder in the base line direction, and freely move in the direction perpendicular to the base line without being displaced by the two pins. As a result, any external force will not be applied to the lens spherical surfaces. Furthermore, the coupling points between the lenses and lens holder are set in the outside of the range of the base length. It is therefore possible to cancel out the expansion or contraction between the lens holder and lenses, to accordingly prevent a displacement of the lens base length to be caused by a change of environmental conditions, and to maintain stable measurement precision.

BRIEF DESCRIPTION OF THE DRAWINGS

The above objects and advantages of the present invention will become apparent from the following detailed description of preferred embodiments when read in connection with the accompanying drawings, in which.

DETAILED DESCRIPTION OF THE PREFERRED EMBODIMENTS OF THE PRESENT INVENTION

Figure 1:
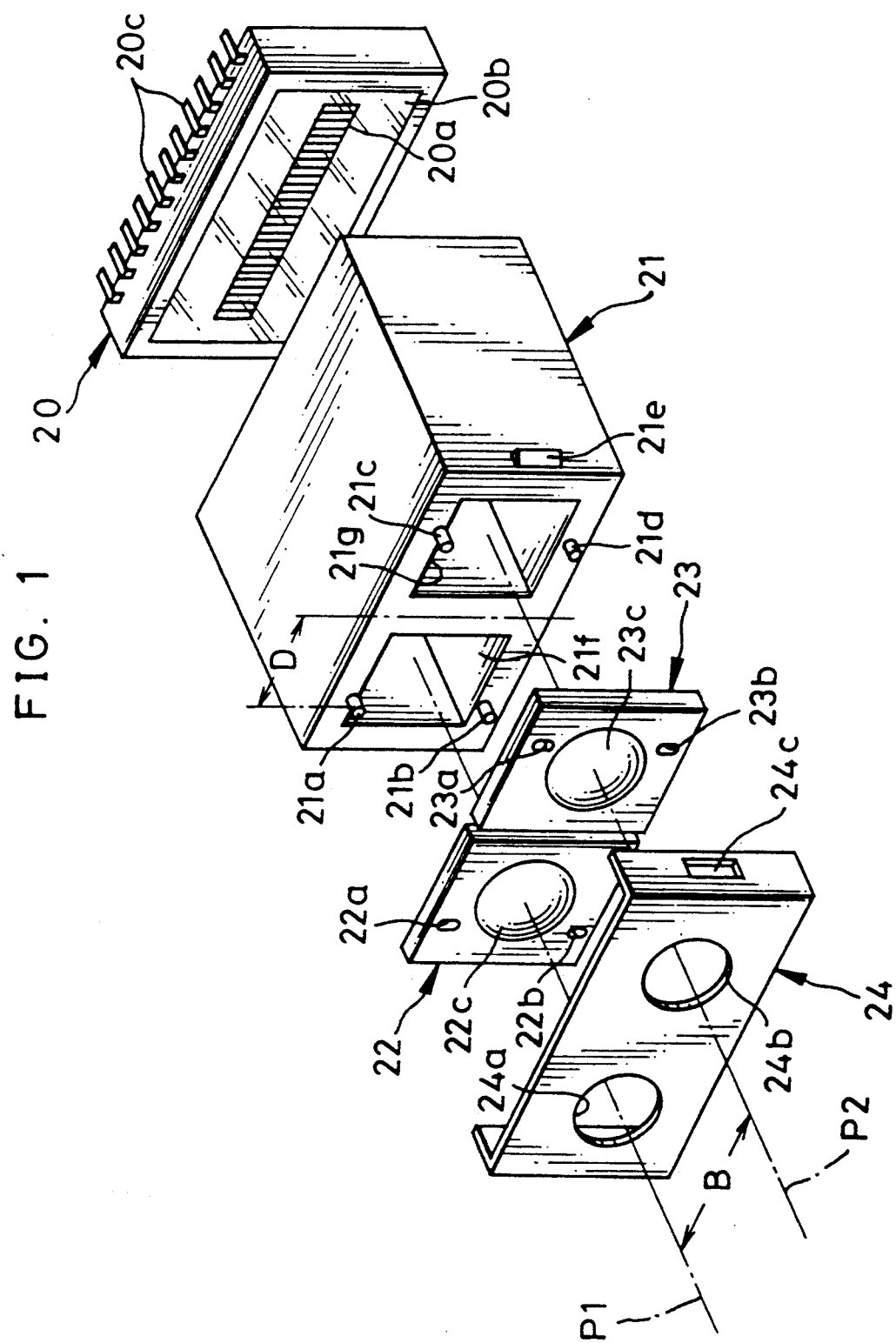
FIG. 1 is a perspective and broken view of an embodiment of a passive type range finding unit.
Figure 2:
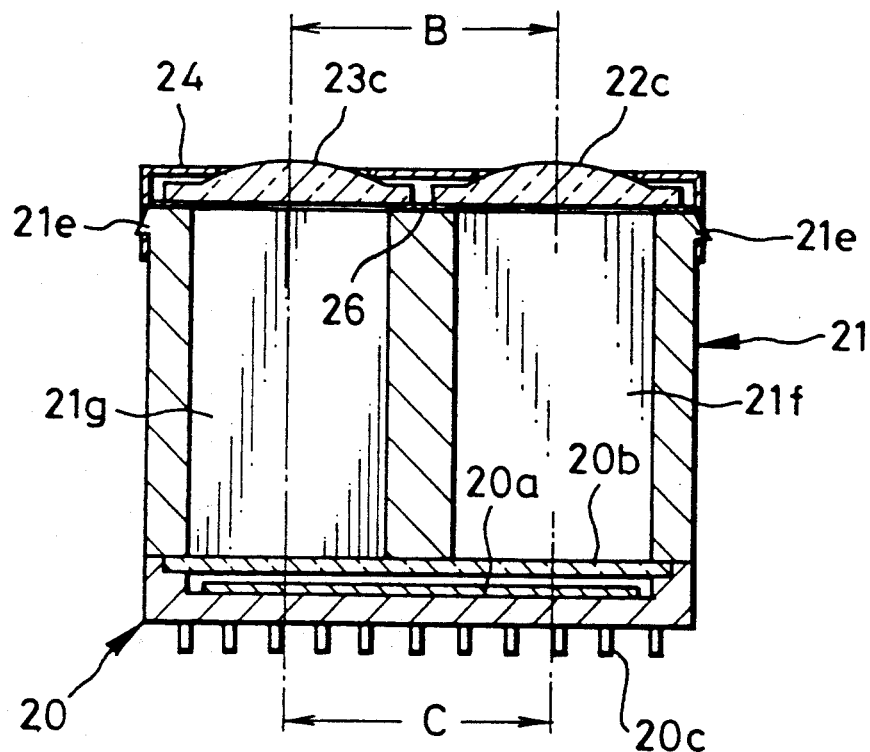
FIG. 2 is a vertical section of the range finding unit shown in FIG. 1.

As shown in FIGS. 1 and 2, a range finding unit comprises an IC package 20, a lens holder 21, a pair of lens plates 22 and 23, and an aperture cover 24. The IC package 20 has a silicon substrate and a transparent cover glass 20b attached to the front surface of the substrate, the substrate and the cover glass 20b being packaged with ceramics. The silicon substrate has a sensor chip 20a and a processing circuit 6 (refer to FIG. 7) formed by integration technique. The sensor chip 20a has a plurality of pixels for converting light into electrical signals. These pixels are linearly disposed at a constant pitch. Reference numeral 20c represents terminal pins of the IC package.

The lens holder 21 formed of a box shape is made of black colored polycarbonate in mixture with glass fibers. The lens holder 21 has two tunnels 21f and 21g of a square shape in cross section, the two tunnels being used as light paths. To the back surface of the lens holder 21, the IC package 20 is fixed e.g. with adhesive agent. Lens positioning pins 21a to 21d are integrally formed on the front surface of the lens holder 21, and two hooks 21e are formed at the opposite side faces thereof. The pins 21a and 21b, and pins 21c and 21d are positioned symmetrically with a vertical center line of the lens holder 21, and outside of the range of a lens base line having a length B, i.e., outside of vertical center lines VL of the tunnels 21f and 21g. For example, setting the lens base length B to 10 mm, the distance D between each pin and a vertical center line of the lens holder 21 is about 7 mm.

The lens plates 22 and 23 are formed by molding transparent acrylic resin. Lens sections 22c and 23c are formed at the central areas in a flat portion of the plates. The lens sections 22c and 23c have the same focal length. Elongated holes 22a and 22b are formed in the flat portion of the lens plate 22, the positioning pins 21a and 21b being inserted into the elongated holes 22a and 22b. The elongated holes 22a and 22b extend in the vertical direction, and the widths thereof in the base line direction are substantially the same as the outer diameters of the pins 21a and 21b. Similarly, elongated holes 23a and 23b are formed in the lens plate 23, the pins 21c and 21d being inserted in the elongated holes 23a and 23b.

The aperture cover 24 formed of a channel shape is made of black colored plastics or black painted metal plate. The aperture cover 24 has two openings 24a and 24b facing the lens sections 22c and 23c. The aperture cover 24 is placed over the lens plates 22 and 23 so as to cover them. The aperture cover 24 is fixed to the lens holder 21 by engaging the hooks 21 with holes 24c, to squeeze the lens plates 22 and 23 therebetween and prevent displacement thereof to be caused by vibrations and shocks. In order to facilitate alignment or collinearity of the optical axes of the lens plates 22 and 23 with the centers of the tunnels 21f and 21g, the lens plates 22 and 23 are bonded to the front surface of the lens holder 21 by means of pressure-sensitive adhesive agent 26 having stickiness at an ordinary temperature.

Engagement of the pins 21a to 21d with the elongated holes 22a, 22b, 23a, and 23b ensures a correct positioning of the lens plates 22 and 23 in the horizontal direction. Thus, the distance between the optical axis P1 of the lens section 22c and the optical axis P2 of the lens section 23c can be definitely determined, providing a lens base length B shown in FIG. 2. This lens base length B is equal to the distance between reference pixels of the sensor chip 20a, i.e., a sensor base length C. The sensor base length C is defined during the assembly process of the range finding unit in accordance with the results of measuring a test subject. Thus, after the assembly adjustment, the sensor base length C becomes always equal to the lens base length B. So long as the lens base length B equals to the sensor base length C, the measurement precision will not be degraded.

Figure 7:
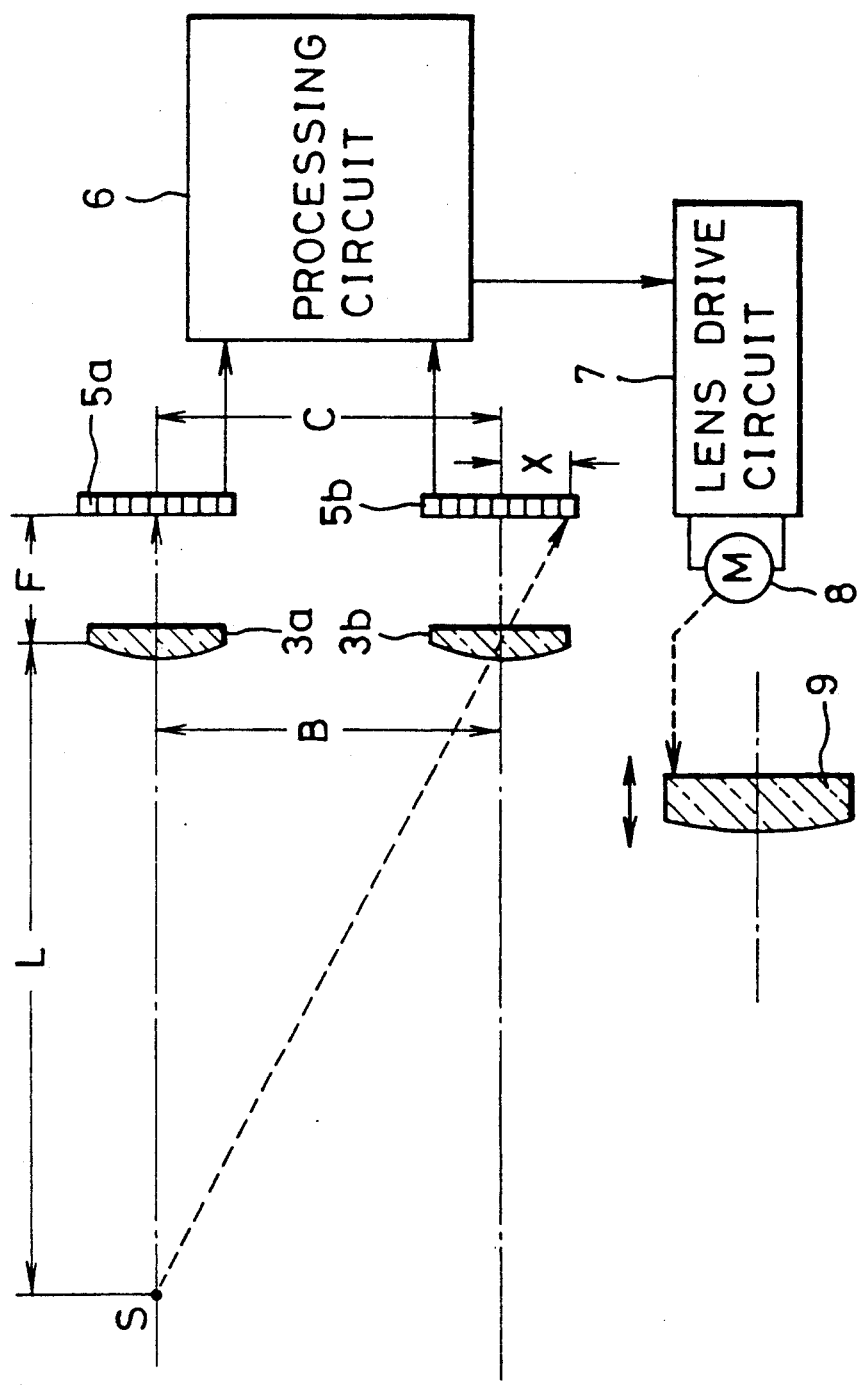
FIG. 7 is a schematic view showing a conventional autofocus system.
Figure 8:
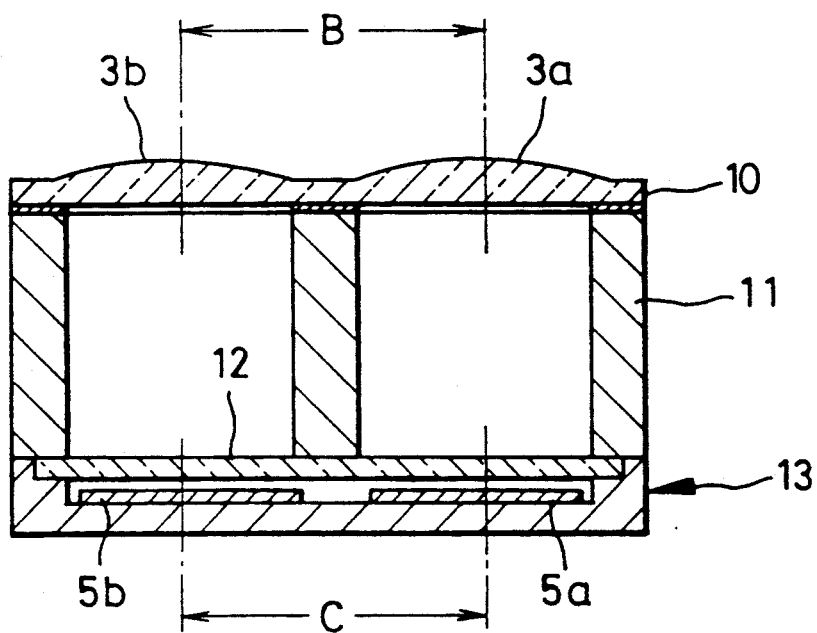
FIG. 8 is a vertical section of a conventional range finding unit.

The sensor chip 20a is not separated into two parts for the two lens plates 22 and 23, unlike the case shown in FIGS. 7 and 8. This sensor chip 20a substantially functions as two line image sensors by dividing a photoelectrically converted signal from the sensor chip 20a into two parts. When a subject distance is measured, two images of a subject are focussed on the sensor chip 20a via the lens sections 22c and 23c. As described previously, electrical signals for the two images are compared to calculate a subject distance. Signals representing the subject distance are sent to a lens drive circuit via the terminal pins 20c.

In assembling the range finding unit, adhesive agent is caused to coat the front surface of the lens holder 21 to attach the lens plates 22 and 23 to the front surface of the lens holder 21. At this time, the pins 21a and 21b are inserted into the elongated holes 22a and 22b of the lens plate 22, and the pins 21c and 21d are inserted into the elongated holes 23a and 23b of the lens plate 23. While checking focussing points of light incident from the lens sections 22c and 23c, the lens plates 22 and 23 are slid in the direction of the vertical center lines VL so as to align the lens optical axes P1 and P2 with the centers of the tunnels 21f and 21g. Since the lens plates 22 and 23 are movably attached to the lens holder 21 by the pressure-sensitive adhesive agent 26, the positions of the lens plates 22 and 23 can be finely adjusted easily. Next, the IC package 20 is fixed to the back surface of the lens holder 21 with adhesive agent. Then, range finding is carried out as to a test subject to determine two reference pixels.

Figure 3:
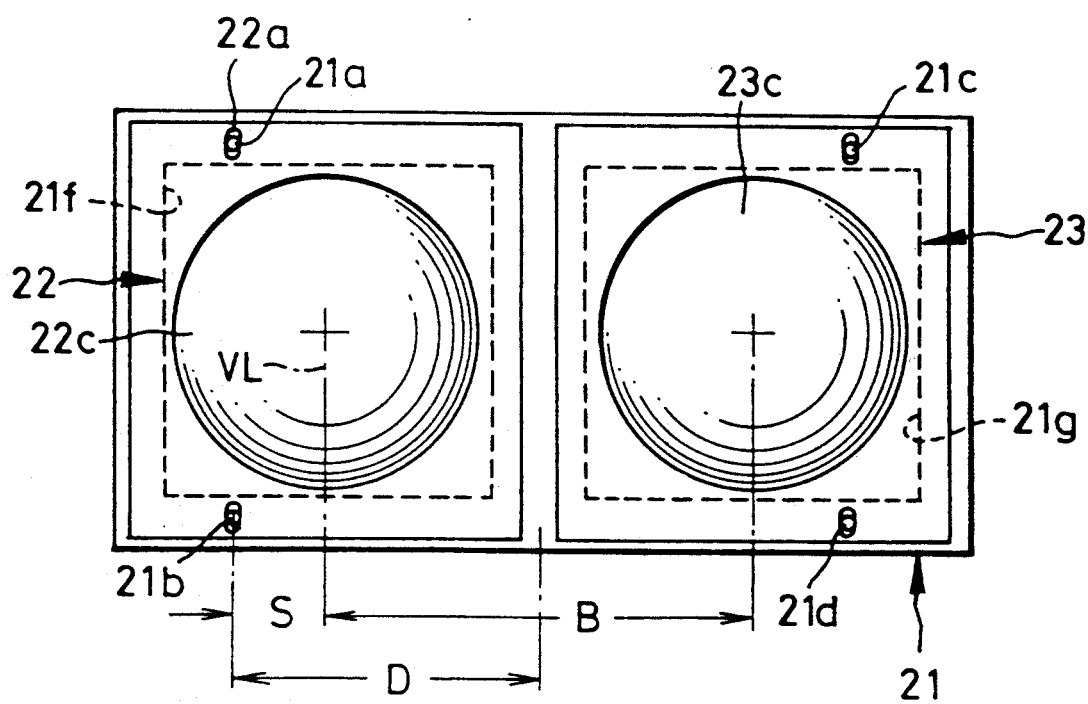
FIG. 3 is a front view of the range finding unit with an aperture cover being removed.

Next, the operation of positioning members of the range finding unit will be described with reference to FIG. 3. If the environmental conditions such as temperature and humidity at the time when a camera is actually used, are substantially the same as those at the time of assembly adjustment, then the lens base length B and sensor base length C are generally the same, allowing a high precision measurement. If the temperature and humidity are different from those at the time of assembly adjustment, the lens holder 21 and lens plates 22 and 23 expand or contract. With respect to the direction along the base line, the lens plates 22 and 23 can be expanded or contracted horizontally from the elongated holes without being displaced by the pins. With respect to the direction vertical to the base line, the lens plates 22 and 23 are allowed to be expanded or contracted freely in engagement of the elongated holes with the pins. No bending or contortion due to a stress in thermal deformation will take place in the lens plates 22 and 23.

Changes in the lens base length B are now taken into further consideration. For example, assuming that the lens holder 21 expands, the distance D of the pins 21a and 21b from the vertical center line of the lens holder 21 changes to "$D+\Delta D$". In the base line direction, the optical axis P1 of the lens section 22c moves to the left by the same distance $\Delta D$ as the lens holder 21 expands, because the pins 21a and 21b are tightly inserted into the elongated holes 22a and 22b in the base line direction.

On the other hand, if the lens plate 22 expands, the distance S between the elongated holes 22a and 22b and the optical axis P1 of the lens section 22c changes to "$S+\Delta S$" and the optical axis P1 of the lens section 22c moves to the right by $\Delta S$ because in this case the origin of expansion is considered as the elongated holes 22a and 22b. Assuming that the sensor base length C does not change and the relation of $\Delta D = \Delta S$ is maintained, the lens base length B is kept unchanged even in expansion of the lens holder 21 and the lens plate 22, so that range finding is performed free from influence of the environmental conditions.

In the range finding unit as embodied actually, the sensor chip 20a is also expanded or contracted so that the sensor base length C changes. A balancing condition is now taken into account such that no deviation takes place between the sensor base length C and the lens base length B. Representing the thermal expansion coefficients of the lens holder 21 and lens plate 22 by $\alpha_H$ and $\alpha_L$, and representing the thermal expansion coefficient of the silicon substrate 20a by $\alpha_S$, then the thermal expansion balancing condition is expressed by the following equation considering $S = D - (B/2)$ in FIG. 3:

$$D \times \alpha_H - S \times \alpha_L = B/2 \times \alpha_S$$

Therefore, the value D is expressed by the following Equation 1:

$$D = B/2 \times (\alpha_L - \alpha_S)/(\alpha_L - \alpha_H)$$

Consider an example where the lens base length B is 10 mm, the coefficient $\alpha_H$ is $3 \times 10^{-5}$ as the lens holder 21 is made of polycarbonate in mixture with 30% glass fibers, the coefficient $\alpha_L$ is $9 \times 10^{-5}$ as the lens plates 22 and 23 are made of acrylic resin, and the coefficient $\alpha_S$ is $0.25 \times 10^{-5}$ as the sensor chip 20a is made of silicon. By substituting these values in the above Equation 1, $D = 7.15$ mm is obtained. Therefore, according to this embodiment, if the value D is set to 7.15 mm at the environmental temperature at the time of assembly adjustment, e.g., at a room temperature, no displacement between the lens base length B and sensor base length C will take place and the range finding performance expected at the time of designing can be maintained, even if the components of the range finding unit are subject to thermal expansion due to temperature change.

The lens holder 21 and lens plates 22 and 23 also expand in the direction perpendicular to the direction of the lens base line. In this direction perpendicular to the lens base line, the elongated holes 22a, 22b, 23a, and 23b provide some play to the pins 21a to 21d. Therefore, even the lens plates 22 and 23 expand, they are not resistive against the pins. Furthermore, even if the optical axes P1 and P2 of the lens plates 22 and 23 move in the direction perpendicular to the lens base line, there is not practical problem as to the measurement precision.

As the balancing condition of hygroscopic expansion, the value D satisfying the following Equation 2 is selected, neglecting the hygroscopic expansion coefficient of the silicon chip 20a because it is very small:

$$D = B/2 \times \beta_L/(\beta_L - \beta_H)$$

where $\beta_L$ and $\beta_H$ are the hygroscopic expansion coefficients of the lens holder 21 and lens plates 22 and 23.

As the same materials as described above are used for the lens holder 21 and lens plates 22 and 23, D=6.67 mm is obtained by substituting $\beta_H=1\times10^{-3}$ and $\beta_L=4\times10^{-5}$ in the above Equation 2. By setting D=6.67 mm at a standard humidity condition, the lens base length B becomes equal to the sensor base length C without being influenced by hygroscopic expansion, thereby providing a stable measurement precision. Furthermore, a difference between the value D for thermal expansion and the value D for hygroscopic expansion is small relative to the lens base length B=10 mm. When the intermediate value D, e.g., D=7 mm, is used, a good compensation function can be obtained for both thermal expansion and hygroscopic expansion.

As seen from the foregoing description, the direction of expansion of the lens holder 21 and the direction of expansion of the lens plates 22 and 23 are made opposite to cancel out a change of the lens base length B due to expansion of the lens holder and lens plates, thereby preventing degradation of measurement precision caused by thermal expansion and hygroscopic expansion. A compensation for a change of the lens base length B can be made more reliable by determining the mounting positions of the lens holder 21 and lens plates 22 and 23 while taking into consideration both the thermal and hygroscopic expansion coefficients. In the case of the sensor chip 20a formed on a silicon substrate, in order to compensate for a change of the sensor base length C caused by thermal expansion of the silicon substrate, relative to the lens base length B, poly-ethylethylketone (PEEK) for example may be used as the material of the lens holder 21, with transparent polycarbonate being used as the material of the lens plates 22 and 23. If ceramics, which have as small a thermal expansion coefficient as the silicon substrate and a negligible hygroscopic coefficient like silicon, are used for the material of the lens holder 21, a change of the lens base length B can be compensated relative to the sensor base length C, by simply forming elongated holes in the lens plates 22 and 23 on the lines perpendicular to the optical axes P1 and P2 and by coupling the lens holder 21 and lens plates 22 and 23 together at the positions of the elongated holes. One elongated hole and one round hole tightly fitted with a pin may be formed in the lens plate. Alternatively, two pins may be formed integrally on the lens plate and corresponding two holes may be formed in the lens holder.

Figure 4:
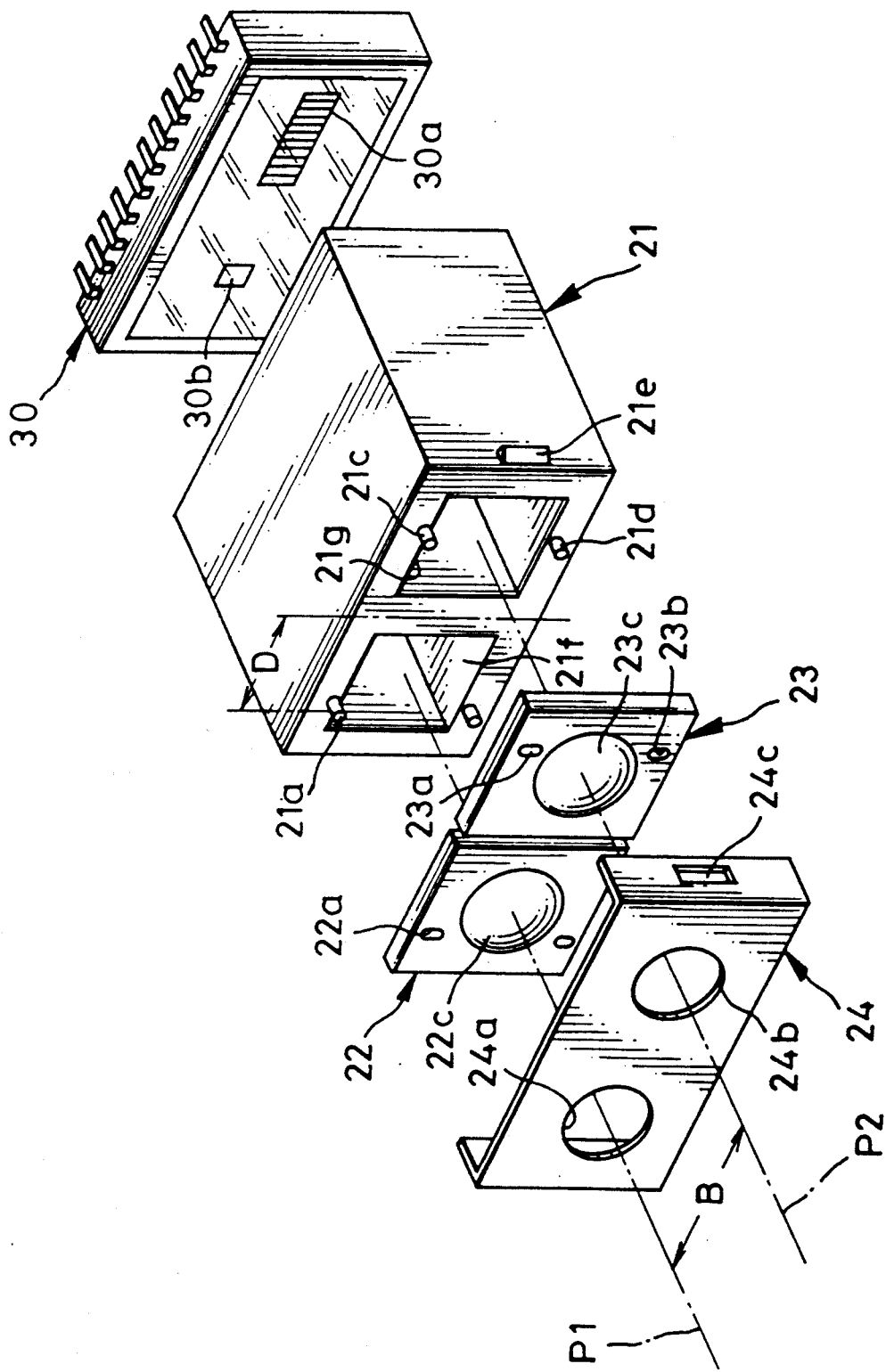
FIG. 4 is a perspective and broken view of an active type range finding unit.

FIG. 4 shows an active type range finding unit. Like elements to the embodiment shown in FIG. 1 are represented by using identical reference numerals. An IC package 30 has a sensor chip 30a and an infrared light emitting diode 30b. The center of the sensor chip 30a is aligned or collinear with the optical axis P2 of the lens section 23c, and the center of the infrared light emitting diode 30b is aligned with the optical axis P1 of the lens section 22c. When a subject distance is measured, infrared light emitted from the infrared light emitting diode 30b is projected via the lens section 22c toward a subject. The infrared light reflected from the subject is incident to the sensor chip 30a via the lens section 23c. The subject distance is obtained from an incident position of the reflected light on to the sensor chip 30a, and a signal representing the obtained subject distance is outputted.

In order to improve measurement precision, the optical specifics of the two lens plates 22 and 23 are required to be the same to thereby obtain the same image. It is advantageous therefore to mold two lens plates 22 and 23 using the same mold. However, when the two lens plates 22 and 23 manufactured using the same mold are mounted on the lens holder 21, it is necessary to mount the lens plate 23 upside down with respect to the lens plate 22. Therefore, if the lens plates 22 and 23 have a molding strain, for example, this strain is enhanced because of reversed mounting positions of the lens plates 22 and 23. As a result, the two images focussed on the chip sensor 20a differ greatly, degrading the measurement precision to a large extent.

Figure 5:
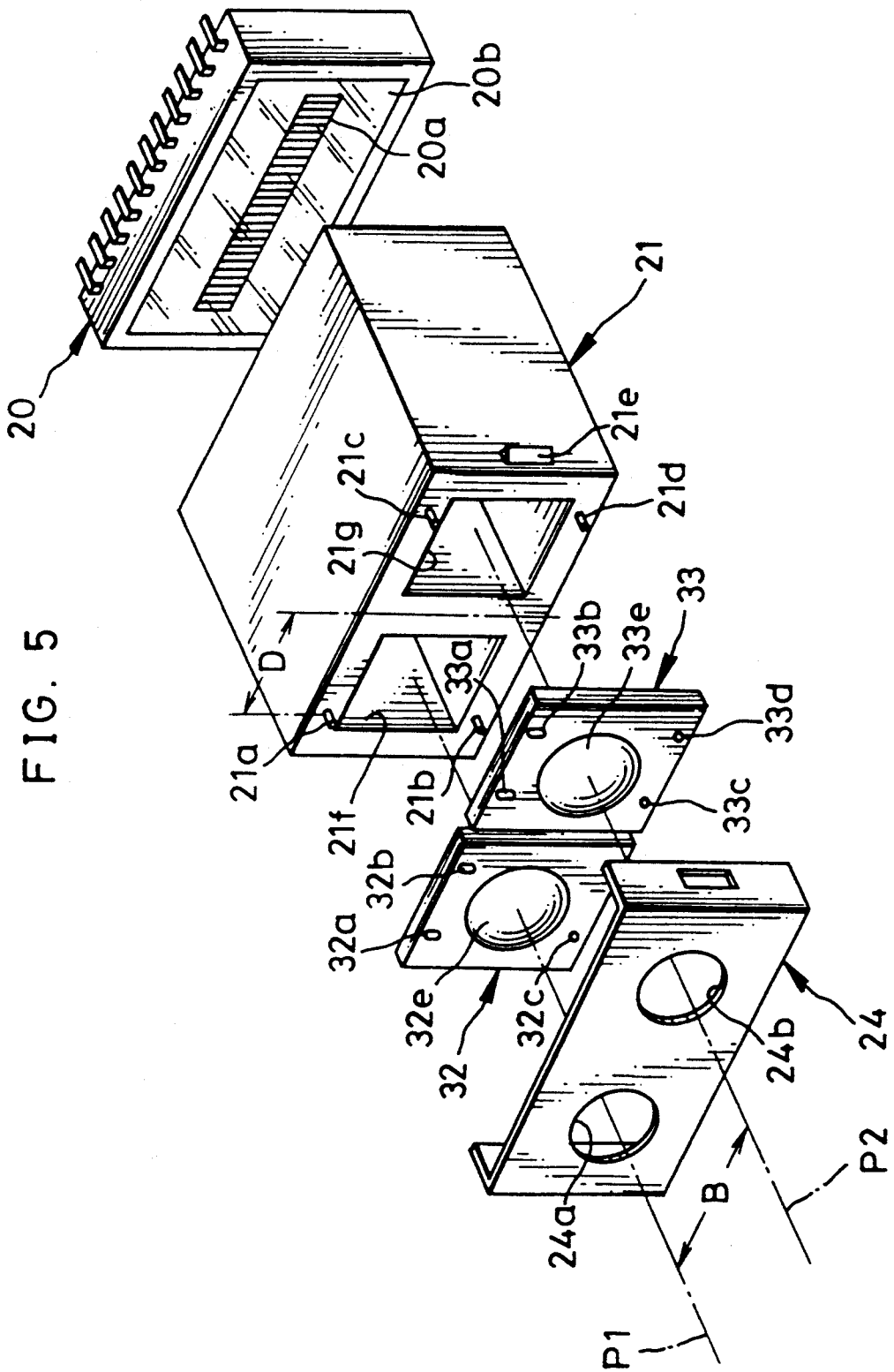
FIG. 5 is a perspective and broken view of another embodiment of the range finding unit according to the present invention.
Figure 6:
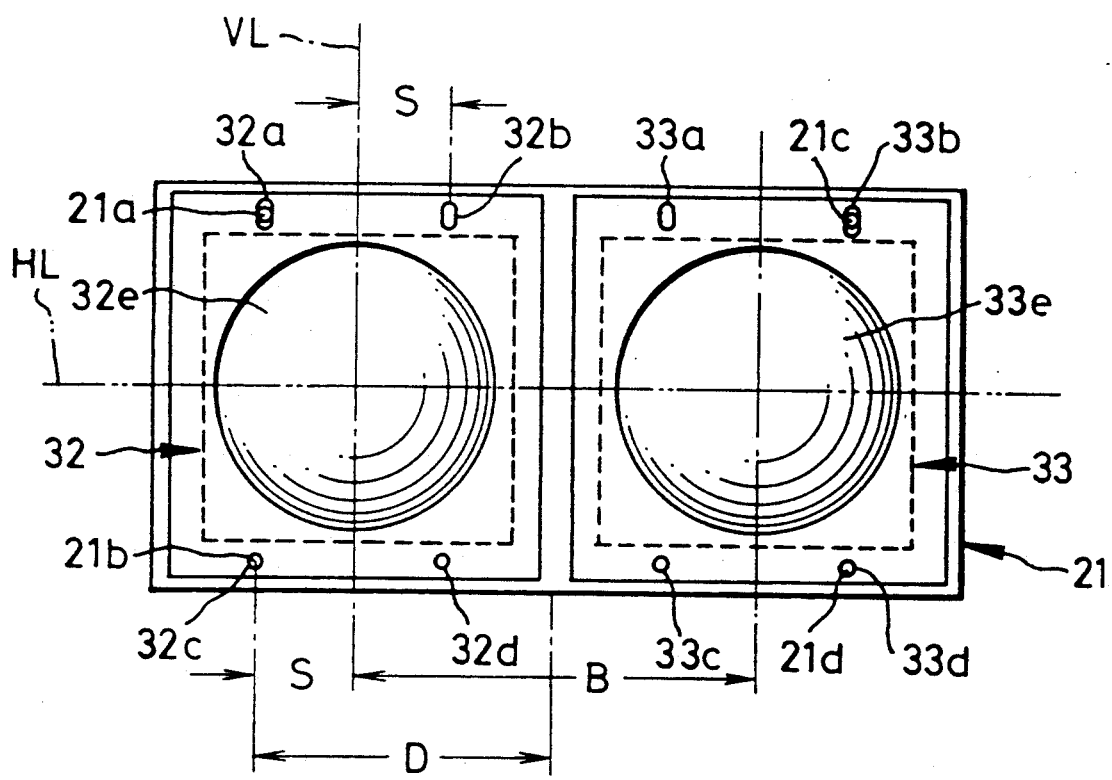
FIG. 6 is a front view of the range finding unit shown in FIG. 5.

FIGS. 5 and 6 show an embodiment allowing to mount two lens plates manufactured using the same mold on a lens holder without placing upside down one of the two lens plates with respect to the other. A lens plate 32 has a lens section 32e and a flat area surrounding the lens section 32e. Two elongated holes 32a and 32b are formed in the upper portion of the flat area, and two round holes 32c and 32d are formed in the lower portion thereof. The elongated hole 32a and round hole 32c are formed on the line perpendicular to the lens base line, at the positions outwardly spaced apart by a distance S from a vertical center line VL, the other elongated hole 32b and round hole 32d being formed at the positions inwardly spaced apart by the distance from the vertical center line VL. The elongated hole 32a and round hole 32c are symmetrical with the elongated hole 32b and round hole 32d relative to the vertical center line VL. In the same manner, elongated holes 33a and 33b and round holes 33c and 33d are formed in the other lens plate 33.

Pins 21a and 21b are inserted into the elongated hole 32a and round hole 32c of the lens plate 32 to hold it in position, without using the elongated hole 32b and round hole 32d. Pins 21c and 21d are fitted in the elongated hole 33b and round hole 33d of the lens plate 33 to hold it in position, without using the elongated hole 33a and round hole 33c.

The two elongated holes and two round holes are formed in each lens plate manufactured by using the same mold, symmetrically with the vertical center line VL. Therefore, it is not necessary to place upside down one of the two lens plates in mounting them on the lens holder 21. If a molding strain is present on the lens plates, the influence of this strain comes into existence on the focussing plane quite the same as to the direction of the lens base line, without causing any measurement error in range finding. In mounting the lens plates 32 and 33, if each lens plate is held so as to face the elongated holes 32a and 32b toward the upper side of the horizontal center line HL and face the round holes 32c and 32d toward the lower side, the mounting work will not be misguided.

When the lens plates 32 and 33 expand by temperature or humidity, they expand also in the direction perpendicular to the lens base line. In this case, there is some play between the pins 21a and 21c and the elongated holes 32a and 33b, so that the lens plates 32 and 33 expand relative to the joints between the other pins 21b and 21d and the round holes 32c and 33d. As a result, when the lens plates 32 and 33 expand in the direction perpendicular to the lens base line, they are not susceptible to resistance by the pins 21a and 21c, preventing the spherical deformation of the lens sections 32e and 33e.

Instead of the elongated holes 32a, 32b, 33a, and 33b, round holes may be used. In this case, each of the lens plates 32 and 33 has four round holes. Alternatively, four elongated holes may be formed in each of the lens plates 32 and 33.

The IC package 20 may be mounted spaced apart from the back surface of the lens holder 21. Instead of pins and holes as the positioning or coupling elements, other coupling elements may also be used, which have play in the direction perpendicular to the base line, such as protrusions and grooves, steps and other receiving steps, and the like. Furthermore, as a lens holder having the light paths, two solid blocks bonded together may be used, the blocks being made of transparent resin or glass for example, with its outer periphery except the front and back surfaces being light shielded.

Various changes and modifications to the illustrative embodiments described above will be apparent to those skilled in the art. These changes and modifications can be made without departing form the spirit and the scope of the invention and without diminishing its attendant advantages. It is therefore intended that such changes and modifications be covered by the following claims.

We claim:

1. A range finding device having a lens holder with first and second light paths for passing light therethrough, and electrical circuit means disposed at the back of the lens holder for generating a signal representing a subject distance measured by a triangulation method, said first and second light paths being juxtaposed in a direction of a base line, said range finding device comprising:
   a first lens disposed in front of said first light path, the optical axis of said first lens being aligned with the central axis of said first light path;
   a second lens disposed in front of said second light path, the optical axis of said second lens being aligned with the central axis of said second light path;
   first means for supporting said first lens at first and second points lying on the front surface of said lens holder and on a first positioning line perpendicular to said base line direction; and
   second means for supporting said second lens at third and fourth points lying on the front surface of said lens holder and on a second positioning line perpendicular to said base line direction.

2. A range finding device according to claim 1, wherein said first and second points are positioned outwardly of a vertical center line extending in the direction perpendicular to said base line and passing through said central axis of said first light path, and said third and fourth points are positioned outwardly of a vertical center line extending in the direction perpendicular to said base line and passing through said central axis of said second light path.

3. A range finding device according to claim 2, wherein:
   said first means comprises first and second pins disposed on said first and second points, and first and second holes into which said first and second pins are fitted; and
   said second means comprises third and fourth pins disposed on said third and fourth points, and third and fourth holes into which said third and fourth pins are fitted.

4. A range finding device according to claim 3, wherein said first to fourth pins are mounted on said lens holder, said first and second holes are formed in a flat area of said first lens, and said third and fourth holes are formed in a flat area of said second lens.

5. A range finding device according to claim 4, wherein said first and third holes are formed longer in the directions of said first and second positioning lines, than in the directions perpendicular to the first mentioned directions.

6. A range finding device according to claim 5, wherein said first and second lenses each comprise a quadrangular flat area and a lens section formed at the central area of said quadrangular flat area.

7. A range finding device according to claim 6, wherein said lens holder has an outer contour shaped in a quadrangular prism, shape, and said first and second light paths are tunnels of a quadrangle as observed in cross section.

8. A range finding device according to claim 7, further comprising an aperture cover disposed in front of said first and second lenses and attached to said lens holder, said aperture cover having two openings facing said lens sections.

9. A range finding device according to claim 8, wherein said first and second lenses are made of acrylic resin, said lens holder is made of polycarbonate with glass fiber mixed therein, a base length between said central axes of said two tunnels is 10 mm, and the distance of said first to fourth pins from a vertical center line of said lens holder is 7 mm.

10. A range finding device according to claim 9, wherein said second and fourth holes are formed longer in the directions of said first and second positioning lines, than in the directions perpendicular to the first mentioned directions.

11. A range finding device according to claim 9, wherein said second and fourth holes are round holes tightly fitted with said first and third pins.

12. A range finding device according to claim 11, further comprising a fifth, elongated hole and a sixth, round hole formed in said flat area of said first lens, the right and left halves of said first lens being made symmetrical, and a seventh, elongated hole and an eighth, round hole formed in said flat area of said second lens, the right and left halves of said second lens being made symmetrical, wherein said first and second lenses are molded using the same mold and are mounted on said lens holder in a state where neither thereof is placed upside down relative to the other.

13. A range finding unit for detecting a distance of a subject by a triangulation method, comprising:
   a lens holder having first and second tunnels of a quadrangular shape as observed in cross section, said first and second tunnels being juxtaposed in a direction of a base line, and said lens holder having an outer contour shaped in a quadrangular prism;
   an IC package for generating a signal representing a subject distance measured by a triangulation method, said IC package being attached to the back surface of said lens holder;
   a first lens disposed in front of said first tunnel, the optical axis of said first lens being aligned with the central axis of said first tunnel, and said first lens having a quadrangular flat area and a lens section formed on the central area in said flat area;
   a second lens disposed in front of said second tunnel, the optical axis of said second lens being aligned with the central axis of said second tunnel, and said second lens having a quadrangular flat area and a lens section formed on the central area in said flat area;

an aperture cover having two aperture openings facing said lens sections, said aperture cover being placed on said first and second lenses, and folded end portions of said aperture cover being fixed to opposite sides of said lens holder;

first means for engaging said first lens at first and second points lying on the front surface of said lens holder and on a first positioning line perpendicular to said base line direction, said first and second points being positioned outwardly of a first vertical center line passing through said central axis of said first tunnel and extending in the direction perpendicular to said base line direction; and second means for engaging said second lens at third and fourth points lying on the front surface of said lens holder and on a second positioning line perpendicular to said base line direction, said third and fourth points being positioned outwardly of a second vertical center line passing through said central axis of said second tunnel and extending in the direction perpendicular to said base line direction.

14. A range finding unit according to claim 13, wherein:

said first means comprises first and second pins mounted on said lens holder, and first and second holes formed in said flat area of said first lens; and said second means comprises third and fourth pins mounted on said lens holder, and third and fourth holes formed in said flat area of said second lens.

15. A range finding unit according to claim 14, further comprising fifth and sixth holes formed in said flat area of said first lens, said fifth and sixth holes being formed symmetrically with said first and second holes relative to said first vertical center line, and seventh and eighth holes formed in said flat area of said second lens, said seventh and eighth holes being formed symmetrically with said third and fourth holes relative to said second vertical center line, wherein said first and second lenses are manufactured using the same mold and are mounted on said lens holder in a state where neither thereof is placed upside down relative to the other.

16. A range finding unit according to claim 15, wherein said first to eighth holes are formed longer in the directions of said first and second positioning lines, than in the directions perpendicular to the first mentioned directions.

17. A range finding unit according to claim 15, wherein said first, third, fifth, and seventh holes formed longer in the direction of said first or second positioning line, than in the directions perpendicular to the first mentioned directions, and said second, fourth, sixth, and eighth holes are round holes tightly fitted with said first and third pins.

18. A range finding unit according to claim 16 or 17, wherein said first and second lenses are made of acrylic resin, said lens holder is made of polycarbonate with glass fiber mixed therein, a base length between said central axes of said two tunnels is 10 mm, and the distance of said first to fourth pins from a center line of said lens holder is 7 mm.

19. A range finding unit according to claim 16 or 17, wherein said IC package includes a line image sensor for photoelectrically converting two images formed through said first and second lenses.

20. A range finding unit according to claim 16 or 17, wherein said IC package includes a light emitting element facing said first tunnel, and a line image sensor facing said second tunnel.

21. A range finding unit comprising:

first and second lenses;

a lens holder for mounting said first and second lenses on the front surface and a range finding circuit unit on the back surface; and a pair of positioning means integrally formed with sid lens holder, for positioning said first and second lenses such that the distance between the optical axes is set equal to the length of the base line of triangulation measurement, and some play is provided in the direction perpendicular to the direction of said base line, wherein said pair of positioning means is mounted outside of the range of said base length and wherein said first and second lenses are made of acrylic resin, said lens holder is made of polycarbonate with glass fiber mixed therein, said base length is 10 mm, and the distance of said positioning means from a center line of said lens holder is 7 mm.

* * * * *

UNITED STATES PATENT AND TRADEMARK OFFICE
CERTIFICATE OF CORRECTION

PATENT NO. : 5,233,382
DATED : Aug. 3, 1993
INVENTOR(S) : Taniguchi et al.

It is certified that error appears in the above-indentified patent and that said Letters Patent is hereby corrected as shown below:

ON THE TITLE PAGE :

Item [30], "Foreign Application Priority Data" change "3-98236" to --3-98246--.

Signed and Sealed this

Twenty-ninth Day of March, 1994

Attest:

BRUCE LEHMAN

Attesting Officer    Commissioner of Patents and Trademarks